No. 732,927. Patented July 7, 1903.

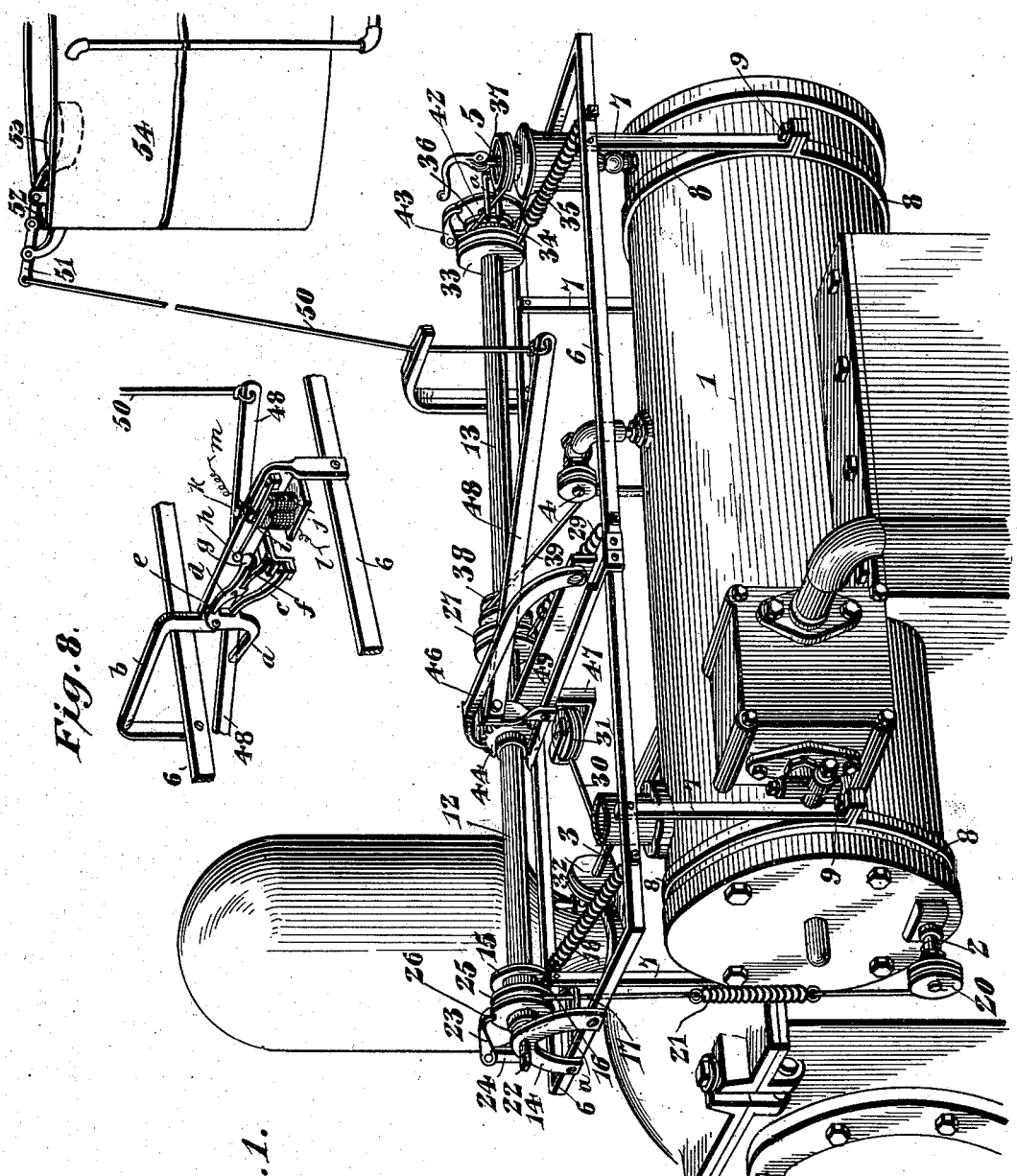

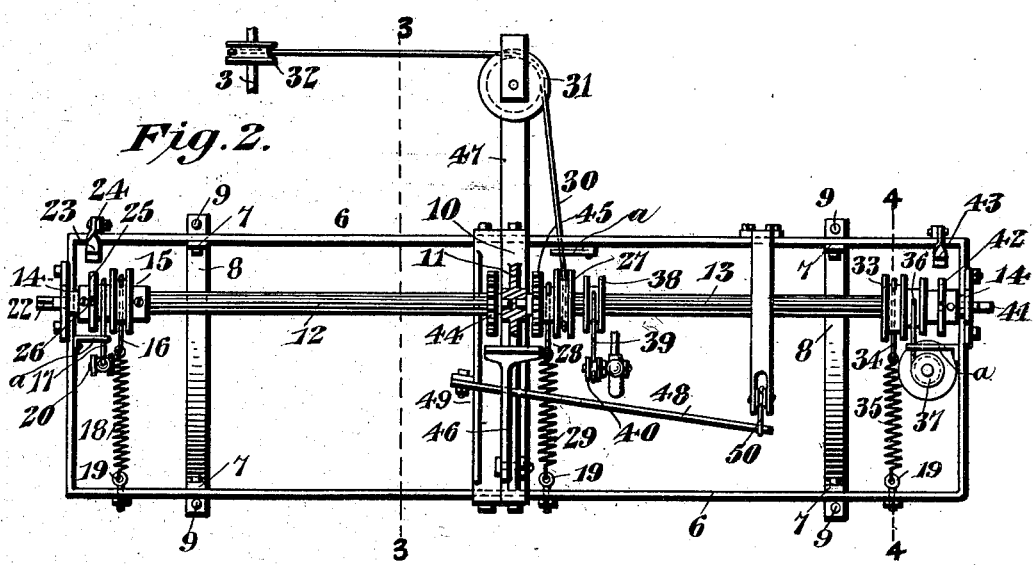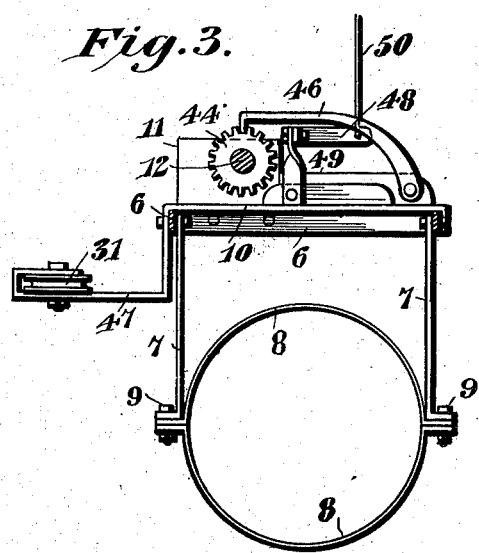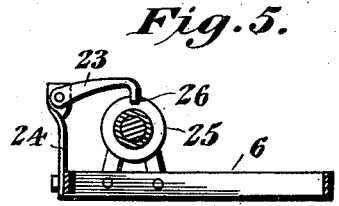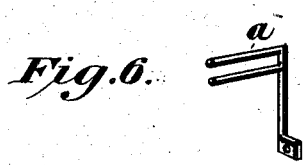

UNITED STATES PATENT OFFICE.

THOMAS DENOYER, OF PAPINEAU, ILLINOIS, ASSIGNOR TO PRIM GAGNON, OF PAPINEAU, ILLINOIS.

AUTOMATIC VALVE-OPERATING MECHANISM.

SPECIFICATION forming part of Letters Patent No. 732,927, dated July 7, 1903.

Application filed April 26, 1902. Serial No. 104,847. (No model.)

*To all whom it may concern:*

Be it known that I, THOMAS DENOYER, a citizen of the United States, residing at Papineau, in the county of Iroquois and State of Illinois, have invented a new and useful Automatic Valve-Operating Attachment, of which the following is a specification.

My present invention relates to an automatic valve-closing attachment for engines, the object being to provide a device readily attachable to any type of engine and capable of simultaneously closing a plurality of valves to stop the engine, either automatically or at the will of the operator.

The attachment is devised with more especial reference to its use in connection with gasolene-engines, the shutting down of which necessitates not only the closing of the throttle-valve, but also the closing of the burner-valve, the water-valve controlling the supply of water to the jacket, and the lubricator-valve controlling the supply of lubricating-oil to the cylinder.

The illustrated form of the invention therefore comprehends operating mechanism connected to the several valves of the engine and held inactive by a trip designed to be moved or tripped either by the operator or by automatic means to release the valve-operating mechanism and effect the simultaneous closing of the several valves and the shutting down of the engine.

Subordinate objects of the invention and other novel features of construction will appear during the course of the succeeding description of the illustrated form of the attachment.

In the accompanying drawings, Figure 1 is a perspective view of my attachment complete applied as in use to a gasolene-engine of the Fairbanks-Morse type. Fig. 2 is a diagrammatical plan view of the attachment, showing the connection between the valve-operating mechanism and the valve-wheels. Fig. 3 is a sectional elevation on the line 3 3 of Fig. 2. Fig. 4 is a sectional view on the line 4 4 of Fig. 2. Fig. 5 is a detail sectional view showing the relation of a dog and check-wheel. Fig. 6 is a detail view of one of the guide-brackets, and Fig. 7 is a detail view of a cone-pulley which may be substituted for the valve-wheels. Fig. 8 is a detail perspective view showing a modified form of the automatic tripping mechanism.

Like characters of reference are employed to designate corresponding parts throughout the several views.

1 indicates the cylinder of a gasolene-engine; 2, the throttle-valve stem; 3, the burner-valve stem; 4, the water-valve stem, and 5 the stem of the lubricator-valve. These several stems are connected, as shown, to the valves which control the admission of an explosive fluid, the operation of the burner, the flow of water to the water-jacket, and the feed of lubricating-oil to the cylinder, and as these parts are all common in the art and well understood, both as to construction and function, a detailed description thereof is not deemed to be necessary for the purpose of this application.

Above the cylinder 1 is located a light metallic supporting-frame 6, of oblong form, carried by standards 7, secured at their lower ends to the opposite sides of divided bands 8, encircling the cylinder adjacent to its opposite ends. The bands 8 are constructed in sections secured together by bolts 9, and these bolts serve the additional purpose of securing the standards to the bands.

At a point intermediate of the ends of the frame the latter is braced by a transverse bar 10, provided adjacent to one end with an upstanding bearing-bracket 11, in which are journaled the inner ends of a pair of operating-shafts 12 and 13, journaled at their outer ends in bearing-brackets 14, bolted or otherwise secured to the end bars of the frame 6. Adjacent to one end of the shaft 12 is keyed or otherwise fixed a double pulley 15, upon which are wound in opposite directions a strap 16 and a cord, cable, or other flexible piece 17. The strap 16 is attached to one end of a power-spring 18, secured to an eyebolt 19, carried by one side bar of the frame.

The flexible piece or connection 17 is led away from the pulley and wound around a peripherally-grooved throttle-valve wheel 20, fixed upon the throttle-valve stem 2. It is desirable that the connecting-cord 17 be somewhat elastic in order to secure an easy turning movement of the valve-stem and to prevent the valve from being closed too tight. This elasticity of the cord may be secured in any desired manner; but I prefer to interpose a spring 21 between the end sections of the cord, as shown in Fig. 1, and the same expedient may be adopted in connection with the several cords leading to the other valves, as will be hereinafter described.

For the purpose of facilitating the rotation of the shaft 12 to effect the winding of the strap 16 upon the pulley 15 said shaft is extended beyond the end of the frame and has a squared extremity 22 for the connection of a winding-crank. (Not illustrated.) The backward rotation of the shaft during the winding thereof is prevented by a dog 23, pivoted at the end of a bracket 24, upstanding from the frame and engaging a check-wheel 25, which may be independent of the pulley 15 or may be formed by providing one of the flanges of said pulley with one or more notches 26 for engagement with the dog.

The shaft 13, which is disposed in alinement with the shaft 12, is provided adjacent to its inner end with a double pulley 27, upon which are oppositely wound a strap 28, connected to a power-spring 29, similar to the spring 18, and a flexible cord, cable, or piece 30, passed around a guide-pulley 31 and attached to the burner-valve wheel 32, fixed to the burner-valve stem 3. Adjacent to its outer end the shaft 13 is provided with a double pulley 33, upon which are oppositely wound a second strap 34, connected to a second power-spring 35, and a flexible cord or piece 36, connected to the lubricator-valve wheel 37. At a point intermediate of the double pulleys 27 and 33 the shaft 13 is provided with an additional pulley 38, connected to one end of a flexible cord or piece 39, secured to the water-valve wheel 40, the connections of the several flexible pieces with their pulleys and valve-wheels being such that the rotation of the shafts under the impulse of the power-springs will effect the rotation of the valve-wheels to close the valves. The shaft 13, like the shaft 12, is formed with a squared extremity 41 and with a notched check-wheel 42, arranged to be engaged by a check-dog 43, carried by the frame.

It will now be obvious that if the shafts are rotated by means of cranks attached to their squared extremities the straps 16, 28, and 34 will be wound upon the pulleys against the resistance of the power-springs and the flexible connecting-pieces 17, 30, 36, and 39 will be unwound from the pulleys, and thus slackened, the shafts being held against backward rotation by the dogs 23 and 43. The opening of the several valves by the engineer in starting up the engine will wind the flexible pieces upon the several valve-wheels and take up the slack in the former, and it will follow that if the shafts are released by throwing back the dogs the rotation of said shafts under the impulse of the power-springs will wind the flexible pieces upon the pulleys and unwind them from the valve-wheels, which operation will serve to rotate the several valve-stems to close the valves and shut down the engine. Guide-fingers a are preferably employed, as shown, to retain the flexible connections in place.

It may be noted at this point that two operating-shafts are employed, for the reason that the closing of the burner, water, and lubricator valves requires a greater number of revolutions of the valve-stems than is necessary for the closing of the throttle-valve. The shaft 13 is therefore connected with the three first-named valves and is provided with a comparatively powerful operating machanism secured by duplicating the power-springs, and in practice the shaft 13 will therefore rotate at a somewhat higher speed than the shaft 12, so that all the valves will close simultaneously, notwithstanding the different number of revolutions required. Instead, however, of effecting the individual release of the operating-shafts by the disengagement of the dogs from the check-wheels I prefer to employ releasing mechanism common to both shafts and arranged to be tripped automatically from a remote point. This releasing mechanism includes a pair of toothed wheels 44 and 45, keyed upon the inner ends of the shafts 12 and 13 and engaged by a pivoted trip 46, preferably mounted on the cross-bar 10, which latter is extended to form a bracket 47 for the support of the guide-pulley 31. The trip 46 is designed to engage the toothed wheels 44 and 45 after the shafts have been wound, and when such engagement is effected the dogs 23 and 43 are thrown back, so that the shafts will be under the control of the single trip 46. This trip is designed to be raised out of engagement with the toothed wheels by means of a trip-lever 48, pivoted at one end to the cross-bar 49 of the frame and extended under the trip, as shown in Figs. 2 and 3.

At its front end the trip-lever 48 is attached to a flexible piece or cable 50, connected to any desired type of automatic tripping mechanism—such, for instance, as a lever 51, pivotally connected to a float-lever 52, carrying a float 53, located within a tank 54, into which water is pumped by pumping apparatus operated from the engine or otherwise. When this arrangement is employed, the rising of the float 53 when the water in the tank has reached a predetermined level will effect a pull upon the cable 50, elevating the trip-lever 48 and raising the trip 46 out of engagement with the toothed wheels. The disengagement of the trip will effect the simultaneous release of the two operating-shafts, and the rotation thereof under the impulse of the power-springs will cause the simultaneous closing of the several valves by means of the intermediate connections.

The float and its connections are merely shown as one form of automatic mechanism for tripping the operating-shafts, and it is evident that when the engine is employed for other than pumping purposes other provision will be made for the automatic release of the valve-operating mechanism at the proper time.

The shutting down of the engine may also be effected from various remote parts of the building by leading cables from the trip-lever, so that in the event of the derangement of the machinery the engine could be shut down at once to prevent the additional damage which would result from delay in communicating with the engineer. Such provision would also result in the saving of life in mills or other similar establishments, because a machine-operator upon being caught by moving parts of the machinery could at once stop the engine by a quick pull upon a cable arranged within convenient reach.

In Fig. 7 I have illustrated a cone-pulley or wheel b, which may be employed in lieu of a valve-wheel in order to accommodate the apparatus to various engines.

In Fig. 8 I have shown another form of automatic tripping mechanism which may be employed in connection with the mechanism shown in Fig. 1, so that the engine may be stopped by the closing of an electric circuit at a remote point of the building or by the elevation of the float in the manner already described. In this figure an angular arm a is pivoted upon a transverse frame-bar b and extends under the trip-lever 48, as shown. The arm a is urged in a direction to elevate the trip-lever by a spring c, but is normally held against such movement by a pivoted trigger d. The trigger engages a notch e in the arm a and is normally held in such engagement by a spring f. The end of the trigger opposite the arm a is formed with a head g, upon which is designed to strike a hammer h, carried by a vibrating armature i, interposed between an electromagnet j and a contact-screw k. Circuit-wires l and m are connected to the magnet and contact-screw, respectively, and extend to a remote point, at which the wires may be connected by a push-pin or other similar circuit-closing device to close the circuit through the electromagnet. When the circuit is thus closed, the vibration of the armature i will cause the hammer h to strike the head g of the trigger d, thereby releasing the trigger and permitting the spring c to swing the arm a, and thus operate the trip-lever 48 to raise the trip 46. It will also be evident that this electrical tripping mechanism might be brought into actuation by the closing of the circuit through the medium of the float.

It is thought that from the foregoing the construction and operation of my attachment will be clearly understood by those skilled in the art; but while the present embodiment of the invention is thought at this time to be preferable I do not limit myself to the structural details defined, as, on the contrary, I reserve the right to effect such changes, modifications, and variations of the illustrated structure as may be comprehended within the scope of the protection prayed.

What I claim is—

1. The combination with a valve and its wheel, of a shaft, a flexible piece oppositely wound upon the valve-wheel and shaft, a power device for rotating the shaft, and a trip normally retaining the shaft against movement.

2. The combination with a valve and its wheel, of a shaft, a flexible piece oppositely wound upon the wheel and shaft, a power device for rotating the shaft, a trip normally restraining the shaft, and means for automatically releasing the trip, 3. The combination with a valve and its wheel, of a shaft, a flexible piece oppositely wound upon the wheel and shaft, a power device for rotating the shaft, a trip normally restraining the shaft, and float-operated means for automatically releasing the trip.

4. The combination with a valve and its wheel, of a shaft, a flexible piece oppositely wound upon the valve-wheel and shaft, a strap wound upon the shaft in a direction opposite to the winding of the flexible piece thereon, a power-spring connected to the strap, and a trip normally restraining the shaft.

5. The combination with a valve and its wheel, of a shaft, a flexible piece wound upon the valve-wheel and shaft, a strap oppositely wound upon the shaft, a power-spring connected to the strap to rotate the shaft, a check-wheel mounted on the shaft, a dog disposed to engage the check-wheel, and a trip normally restraining the shaft.

6. The combination with a valve and its wheel, of a shaft provided with a double pulley, a check-wheel and a toothed wheel, a flexible piece and a strap oppositely wound upon the double pulley, said flexible piece being also wound upon the valve-wheel, a power device connected to the strap, a dog disposed to engage the check-wheel, a pivoted trip engaging the toothed wheel, and means for operating the trip.

7. The combination with a plurality of valves, of a pair of operating-shafts operatively connected to the valves, power mechanism for rotating the shafts, and a trip common to both shafts and normally retaining them against movement.

8. The combination with a plurality of valves, of a pair of operating-shafts operatively connected to the valves, power mechanism for rotating the shafts, a trip common to both shafts and normally retaining them against movement, and means for automatically operating the trip to release the shafts.

9. The combination with a plurality of valves, of a plurality of operating-shafts, independent power mechanism for each shaft, flexible pieces operatively connecting the valves with the shafts, and a trip common to both shafts and normally retaining them against movement.

10. The combination with a plurality of valves and their wheels, of a plurality of operating-shafts, independent power mechanism for each shaft, flexible pieces wound upon the valve-wheels and shafts, respectively, a common trip normally retaining both shafts against movement, and a trip-lever for operating the trip.

11. The combination with a plurality of valves and valve-wheels, of a pair of operating-shafts, flexible pieces wound around the valve-wheels and shafts, respectively, power mechanism for rotating the shafts, a common trip device for both shafts, a trip-lever disposed to operate the trip, and float-operated means for actuating the trip-lever.

12. The combination with a plurality of valves, of a pair of operating-shafts provided with pulleys and toothed wheels, flexible pieces wound upon the pulleys and around the valve-wheels, straps wound upon the pulleys in a direction opposite to the winding of the flexible pieces thereon, power-springs connected to the straps, and a single trip engaging the toothed wheels of both shafts.

13. The combination with a plurality of valves and their wheels, of a pair of operating-shafts provided with pulleys, check-wheels and toothed wheels, flexible pieces wound around the pulleys on the shafts and around the valve-wheels, straps also wound upon the pulleys on the shafts, power-springs connected to the straps and exerting a constant tendency to rotate the shafts in a direction to wind the flexible pieces upon the shaft-pulleys, dogs arranged to engage the check-wheels, a single trip engaging the toothed wheels of both shafts, a trip-lever for operating the trip, and mechanism for automatically operating the trip-lever.

14. The combination with an engine comprising a cylinder, valves and valve-wheels, of a valve-closing attachment comprising a frame having bands arranged to engage the engine-cylinder, and valve-operating mechanism carried by the frame and operatively connected to the valve-wheels.

15. The combination with an engine including a cylinder, a valve and valve-wheel, of an elastic flexible piece wound upon the valve-wheel, and means for exerting a pull upon the flexible piece to rotate the valve-wheel and operate the valve.

16. The combination with an engine including a cylinder, a valve and valve-wheel, of a flexible piece wound upon the valve-wheel and including a spring, and means for exerting a pull upon the flexible piece to rotate the valve-wheel and operate the valve.

17. The combination with an engine including a cylinder, a throttle-valve, a burner-valve, a water-valve and a lubricating-valve, of valve-operating mechanism connected to all of said valves, and a trip normally restraining said mechanism.

In testimony that I claim the foregoing as my own I have hereto affixed my signature in the presence of two witnesses.

THOMAS DENOYER.

Witnesses:
PRIM GAGNON,
HENRY LOTTINVILLE.